(12) United States Patent
McCay et al.

(10) Patent No.: US 6,229,111 B1
(45) Date of Patent: May 8, 2001

(54) METHOD FOR LASER/PLASMA SURFACE ALLOYING

(75) Inventors: Mary Helen McCay; T. Dwayne McCay, both of Monteagle; John A. Hopkins; Narendra B. Dahotre, both of Tullahoma; C. Michael Sharp, Belvidere; Frederick A. Schwartz, Woodbury; John Brice Bible, South Pittsburg, all of TN (US)

(73) Assignee: The University of Tennessee Research Corporation, Knoxville, TN (US)

( * ) Notice: Subject to any disclaimer, the term of this patent is extended or adjusted under 35 U.S.C. 154(b) by 0 days.

(21) Appl. No.: 09/417,445

(22) Filed: Oct. 13, 1999

(51) Int. Cl.$^7$ ........................................ B23K 9/04
(52) U.S. Cl. .................... 219/121.59; 219/121.6
(58) Field of Search ............ 219/121.59, 121.6, 219/121.47, 121.83, 121.84, 121.85, 63, 64; 427/531, 553, 595, 596, 248.1, 554; 148/512, 511; 359/668; C23C 04/12, 4/18, 4/02

(56) References Cited

U.S. PATENT DOCUMENTS

| | | |
|---|---|---|
| 3,705,758 | 12/1972 | Haskal . |
| 3,848,104 | 11/1974 | Locke . |
| 3,986,767 | 10/1976 | Rexer et al. . |
| 4,015,100 | 3/1977 | Gnanamuthu et al. . |
| 4,017,708 | 4/1977 | Engel et al. . |
| 4,157,923 | 6/1979 | Yen et al. . |
| 4,212,900 | 7/1980 | Serlin . |
| 4,322,601 | 3/1982 | Serlin . |
| 4,434,189 | 2/1984 | Zaplatynsky . |
| 4,475,027 | 10/1984 | Pressley . |
| 4,480,169 | 10/1984 | Macken . |
| 4,495,255 | 1/1985 | Draper et al. . |
| 4,535,218 | 8/1985 | Krause et al. . |
| 4,617,070 | 10/1986 | Amende et al. . |
| 4,638,163 | 1/1987 | Braunlich et al. . |
| 4,644,127 | 2/1987 | La Rocca . |
| 4,689,467 | * 8/1987 | Inoue ................................ 219/121.6 |

(List continued on next page.)

FOREIGN PATENT DOCUMENTS

| | | |
|---|---|---|
| 4126351 | 2/1993 | (DE) . |
| 199 41 563 | * 8/2000 | (DE) . |
| 876870A1 | 4/1998 | (EP) . |
| 903423 | * 3/1999 | (EP) . |
| 279692 | 11/1988 | (JP) . |
| 401083676A | 3/1989 | (JP) . |
| 381082 | 4/1991 | (JP) . |
| 3115587A | 5/1991 | (JP) . |
| 403115531A | 5/1991 | (JP) . |
| 5285686 | 11/1993 | (JP) . |
| 1557193 | 4/1990 | (SU) . |
| 1743770 | 6/1992 | (SU) . |
| WO 95/21720 | 8/1995 | (WO) . |
| WO 97/47397 | 12/1997 | (WO) . |

OTHER PUBLICATIONS

Ayers, et al.; "A Laser Processing Technique for Improving the Wear Resistance of Metals," *Journal of Metals,* Aug. 1981, 19–23.

(List continued on next page.)

*Primary Examiner*—Tu Ba Hoang
*Assistant Examiner*—Quang Van
(74) *Attorney, Agent, or Firm*—Duane, Morris & Heckscher LLP

(57) ABSTRACT

The present invention is directed toward a method for plasma assisted laser surface alloying. Specifically, the present invention is directed toward a method for surface alloying using a laser beam having a rectangular cross sectional area and a plasma arc, in order to produce an alloyed substrate on the surface of the material.

20 Claims, 5 Drawing Sheets

U.S. PATENT DOCUMENTS

| | | |
|---|---|---|
| 4,720,312 | 1/1988 | Fukuizumi et al. . |
| 4,724,299 | 2/1988 | Hammeke . |
| 4,746,540 | 5/1988 | Kawasaki et al. . |
| 4,750,947 | 6/1988 | Yoshiwara et al. . |
| 4,801,352 | 1/1989 | Piwczyk . |
| 4,839,518 | 6/1989 | Braunlich et al. . |
| 4,847,112 | 7/1989 | Halleux . |
| 4,898,650 | 2/1990 | Wu et al. . |
| 4,904,498 | 2/1990 | Wu . |
| 4,964,967 | 10/1990 | Hashimoto et al. . |
| 4,981,716 | 1/1991 | Sundstrom . |
| 4,998,005 | 3/1991 | Rathi et al. . |
| 5,059,013 | 10/1991 | Jain . |
| 5,095,386 | 3/1992 | Scheibengraber . |
| 5,124,993 | 6/1992 | Braunlich et al. . |
| 5,130,172 | 7/1992 | Hicks et al. . |
| 5,147,999 | 9/1992 | Dekumbis et al. . |
| 5,196,672 | 3/1993 | Matsuyama et al. . |
| 5,208,431 | 5/1993 | Uchiyama et al. . |
| 5,230,755 | 7/1993 | Pierantoni et al. . |
| 5,247,155 | 9/1993 | Steen et al. . |
| 5,257,274 | 10/1993 | Barrett et al. . |
| 5,265,114 | 11/1993 | Sun et al. . |
| 5,267,013 | 11/1993 | Spence . |
| 5,290,368 | 3/1994 | Gavigan et al. . |
| 5,308,431 | 5/1994 | Maher et al. . |
| 5,314,003 | 5/1994 | Mackay . |
| 5,319,195 | 6/1994 | Jones et al. . |
| 5,321,224 * | 6/1994 | Kamimura et al. ............... 219/76.15 |
| 5,322,436 | 6/1994 | Horng et al. . |
| 5,331,466 | 7/1994 | Van Saarloos . |
| 5,352,538 | 10/1994 | Takeda et al. . |
| 5,387,292 | 2/1995 | Morishige et al. . |
| 5,406,042 | 4/1995 | Engelfriet et al. . |
| 5,409,741 | 4/1995 | Laude . |
| 5,411,770 | 5/1995 | Tsai et al. . |
| 5,430,270 | 7/1995 | Findlan et al. . |
| 5,446,258 | 8/1995 | Mordike . |
| 5,449,536 | 9/1995 | Funkhouser et al. . |
| 5,466,906 | 11/1995 | McCune, Jr. et al. . |
| 5,484,980 | 1/1996 | Pratt et al. . |
| 5,486,677 | 1/1996 | Maischner et al. . |
| 5,491,317 | 2/1996 | Pirl . |
| 5,514,849 | 5/1996 | Findlan et al. . |
| 5,530,221 | 6/1996 | Benda et al. . |
| 5,546,214 | 8/1996 | Black et al. . |
| 5,563,095 | 10/1996 | Frey . |
| 5,614,114 | 3/1997 | Owen . |
| 5,643,641 | 7/1997 | Turchan et al. . |
| 5,659,479 | 8/1997 | Duley et al. . |
| 5,874,011 | 2/1999 | Ehrlich . |
| 6,133,541 * | 10/2000 | Neubauer et al. .............. 219/121.44 |

OTHER PUBLICATIONS

Belvaux, et al.; "A Method for Obtaining a Uniform Non–Gaussian Laser Illumination," *Optics Communications*, vol. 15, No. 2, Oct. 1975, 193–195.

Bett, et al.; "Binary phase zone–plate arrays for laser–beam spatial–intensity distribution conversion," *Applied Optics*, vol. 34, No. 20, Jul. 10, 1995, 4025–4036.

Bewsher, et al.; "Design of single–element laser–beam shape projectors," Applied *Optics*, vol. 35, No. 10, Apr. 1, 1996, 1654–1658.

Breinan, et al.; "Processing material with lasers," *Physics Today*, Nov. 1976, 44–50.

Bruno, et al.; "Laserbeam Shaping for Maximum Uniformity and Maximum Loss, A Novel Mirror Arrangement Folds the Lobes of a Multimode Laserbeam Back onto its Center," *Lasers & Applications*, Apr. 1987, 91–94.

Chen, et al.; "The Use of a Kaleidoscope to Obtain Uniform Flux Over a Large Area in a Solar or Arc Imaging Furnace," *Applied Optics*, vol. 2, No. 3, Mar. 1963, 265–571.

Christodoulou, et al.; "Laser surface melting of some alloy steels," *Metals Technology*, Jun. 1983, vol. 10, 215–222.

Cullis, et al.; "A device for laser beam diffusion and homogenisation," J. Phys.E:Sci. Instrum., vol. 12, 1979, 688–689.

Dahotre, et al., "Development of microstructure in laser surface alloying of steel with chromium," *Journal of Materials Science*, vol. 25, 1990, 445–454.

Dahotre, et al., "Laser Surface Melting and Alloying of Steel with Chromium," *Laser Material Processing III*, 1989, 3–19.

Fernelius, et al.; "Design and Testing of a Refractive Laser Beam Homogenizer," *Airforce Writing Aeronautical Laboratories Report*, (AFWAL–TR–84–4042), Sep. 1984, 46 pages.

Frieden; "Lossless Conversion of a Plane Laser Wave to a Plane Wave of Uniform Irradiance," *Applied Optics*, vol. 4, No. 11, Nov. 1965, 1400–1403.

Galletti, et al.; "Transverse–mode selection in apertured super–Gaussian resonators: an experimental and numerical investigation for a pulsed $CO_2$ Doppler lidar transmitter," *Applied Optics*, vol. 36, No. 6, Feb. 20, 1997, 1269–1277.

Gori, et al.; "Shape–invariance range of a light beam," *Optics Letters*, vol. 21, No. 16, Aug. 15, 1996, 1205–1207.

Grojean, et al.; "Production of flat top beam profiles for high energy lasers," Rev. Sci. Instrum. 51(3), Mar. 1980, 375–376.

Hella, "Material Processing with High Power Lasers," *Optical Engineering*, vol. 17, No. 3, May–Jun. 1978, 198–201.

Ignatiev, et al.; "Real–time pyrometry in laser machining," *Measurement and Science Technology*, vol. 5, No. 5, 563–573.

"Laser Removing of Lead–Based Paint" Illinois Department of Transportation, Jun. 1992, 26 pages.

Jones, et al.; "Laser–beam analysis pinpoints critical parameters," *Laser Focus World*, Jan. 1993, 123–130.

Khanna, et al.; "The Effect of Stainless Steel Plasma Coating and Laser Treatment on the Oxidation Resistance of Mild Steel," *Corrosion Science*, vol. 33, No. 6, 1992, 949–958.

"New Products" *Laser Focus World*, Aug. 1996, 173.

Lugscheider, et al.;" A Comparison of the Properties of Coatings Produced by Laser Cladding and Conventional Methods," *Surface Modification Technologies V*, The Institute of Materials, 1992, 383–400.

Manna, et al.; "A One–dimensional Heat Transfer Model for Laser Surface Alloying of Chromium on Copper Substrate," *Department of Metallurgical & Materials Engineering*, Indian Institute of Technology, vol. 86, n. 5, May 1995, 362–364.

Mazille, et al.; "Surface Alloying of Mild Steel by Laser Melting of Nickel and Nickel/Chromium Precoatings," *Materials Performance Maintenance*, Aug. 1991, 71–83.

Molian; "Characterization of Fusion Zone Defects in Laser Surface Alloying Applications," *Scripta Metallurgica*, vol. 17, 1983, 1311–1314.

Molian; "Effect of Fusion Zone Shape on the Composition Uniformity of Laser Surface Alloyed Iron," *Scripta Metallurgica,* vol. 16, 1982, 65–68.

Molian; Structure and hardness of laser–processed Fe–0.2%C–5%CR and Fe–0.2%C–10%Cr alloys; *Journal of Materials Science,* vol. 20, 1985, 2903–2912.

"Line–Focussing Optics for Multiple–Pass Laser Welding," NASA Tech Briefs MFS–29976, date unknown.

"Cylindrical Lenses," *Newport Technical Guide,* date unknown, N–65.

"Fused Silica Cylindrical Lenses," *Newport Technical Guide,.* date unknown, N–68.

Oswald, et al.; "Measurement and modeling of primary beam shape in an ion microprobe mass analyser," IOP Publishing Ltd., 1990, 255–259.

Renaud, et al., "Surface Alloying of Mild Steel by Laser Melting of an Electroless Nickel Deposit Containing Chromium Carbides," *Materials & Manufacturing Processes,* 6(2), 1991, 315–330.

Smurov, et al.; "Peculiarities of pulse laser alloying: Influence of spatial distribution of the beam," J. Appl. Phys. 71(7), Apr. 1, 1992, 3147–3158.

"Spawr Integrator," Spawr Optical Research, Inc., Data Sheet No. 512, Jun. 1986.

Veldkamp, et al.; "Beam profile shaping for laser radars that use detector arrays," *Applied Optics,* vol. 21, No. 2, Jan. 15, 1982, 345–358.

Veldkamp; "Laser Beam Profile Shaping with Binary Diffraction Gratings," *Optics communications,* vol. 38, No. 5,6, Sep. 1, 1981, 381–386.

Veldkamp; "Laser beam profile shpaing with interlaced binary diffraction gratings," *Applied Optics,* vol. 21, No. 17, Sep. 1, 1982, 3209–3212.

Veldkamp; "Technique for generating focal–plane flattop laser–beam profiles," Rev. Sci. Instru., vol. 53, No. 3, Mar. 1982, 294–297.

Walker, et al.; "Laser surface alloying of iron and 1C–1•4CR steel with carbon," *Metals Technology,* vol. 11, Sep. 1984, 5 pages.

Walker, et al.; "The laser surface–alloying of iron with carbon," Journal of Material Science vol. 20, 1985, 989–995.

Wei, et al.; "Investigation of High–Intensity Beam Characteristics on Welding Cavity Shape and Temperature Distribution," Journal of Heat Transfer, vol. 112, Feb. 1990, 163–169.

Charschan, "Lasers in industry," *Laser Processing Fundamentals,* (Van Nostrand Reinhold Company), Chapter 3, Sec. 3–1, 139–145.

Fernelius, et al; "Calculations Used in the Design of a Refractive Laser Beam Homogenizer," *Airforce Writing Aeronautical Laboratories Report,* (AFWAL–TR–84–4047), Aug. 1984, 18 pages.

Jain, et al.; "Laser Induced Surface Alloy Formation and Diffusion of Antimony in Aluminum," *Nuclear Instruments and Method,* vol. 168, 275–282, 1980.

Molian; "Estimation of cooling rates in laser surface alloying processes," Journal of Materials Science Letters, vol. 4, 1985, 265–267.

"High Power CW Nd:YAG Laser Transformation Hardening," Hobart Laser Products, 2 pages.

ASM Handbook, vol. 6, Welding, Brazing, and Soldering, 1993.

* cited by examiner

METHOD FOR LASER/PLASMA SURFACE ALLOYING

BACKGROUND OF THE INVENTION

1. Field of the Invention

The present invention is directed toward a method for plasma assisted laser surface alloying. Specifically, the present invention is directed toward a method for surface alloying using a laser beam having a rectangular cross sectional area and a plasma arc, in order to produce an alloyed substrate on the surface of the material.

2. Description of the Prior Art

Laser beams have been used to irradiate the surface of a material coated with preselected alloying elements in order to produce a substrate having enhanced physical and/or metallurgical characteristics. The speed with which the surface of a material may be processed by laser alloying is a function of the thermal energy input produced by the laser. Greater processing speeds require more powerful and more expensive lasers.

The processing speed with which a material can be laser alloyed is also a function of the width of the laser beam used for alloying. Producing a laser beam having a greater cross sectional area, while maintaining a constant power density requires a larger and more expensive laser.

Plasma arcs have been used in the field of laser welding to provide increased energy input to the weld area without the power expenditure needed to produce an equivalent increase in energy input using only a laser. Prior art plasma assisted welding techniques have used a laser beam having a circular cross sectional area.

The present invention provides a plasma arc assisted method of laser alloying in which a plasma arc is used in conjunction with a laser beam having a rectangular cross sectional area. The plasma arc provides additional energy input resulting in an increase in processing speed, without the corresponding increase in cost that would result from using a more powerful laser to produce the increased energy input. Additionally, the plasma arc results in additional heating to the zone surrounding the melt region, thereby reducing the thermal gradient between the melt region and the adjacent regions of the material that is being processed. This reduced thermal gradient results in a reduced cooling rate which is regarded as advantageous.

SUMMARY OF THE INVENTION

The present invention is directed toward a method for laser/plasma surface alloying. This method comprises applying a precursor layer comprising a binder and a ceramic or metallic powder comprising chromium or silicon carbide to the surface of a metal substrate. The invention further comprises irradiating the surface of a substrate with a laser beam having a rectangular cross sectional area. The irradiation takes place at a sufficient energy level and for a sufficient time to melt a portion of the substrate such that it forms an alloy with the precursor.

The invention further comprises directing an uncollimated plasma arc to the surface of the substrate at the same time and location as the irradiating with the laser beam. While the irradiation takes place, the substrate is moved relative to the laser beam and the plasma arc.

DESCRIPTION OF THE PREFERRED EMBODIMENTS

A first embodiment of the present invention is directed toward a method for laser/plasma surface alloying. The invention comprises applying a precursor layer comprising a binder and a ceramic or metallic powder comprising chromium or silicon carbide to the surface of the metal substrate 39, as shown in Block 10 of FIG. 1 and in FIG. 3.

Figure 3:
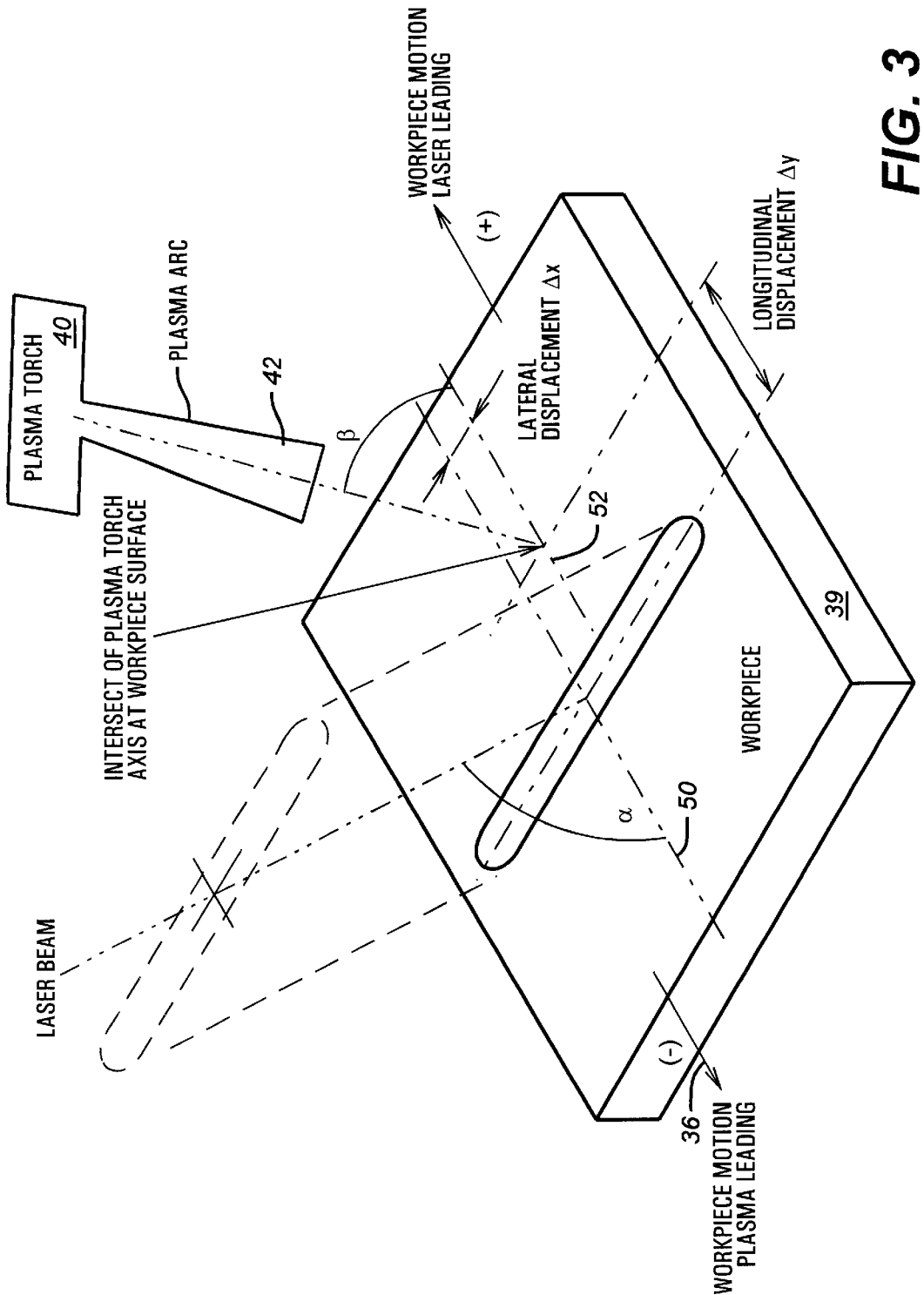
FIG. 3 is an isometric view of an apparatus for practicing the present invention.
Figure 4:
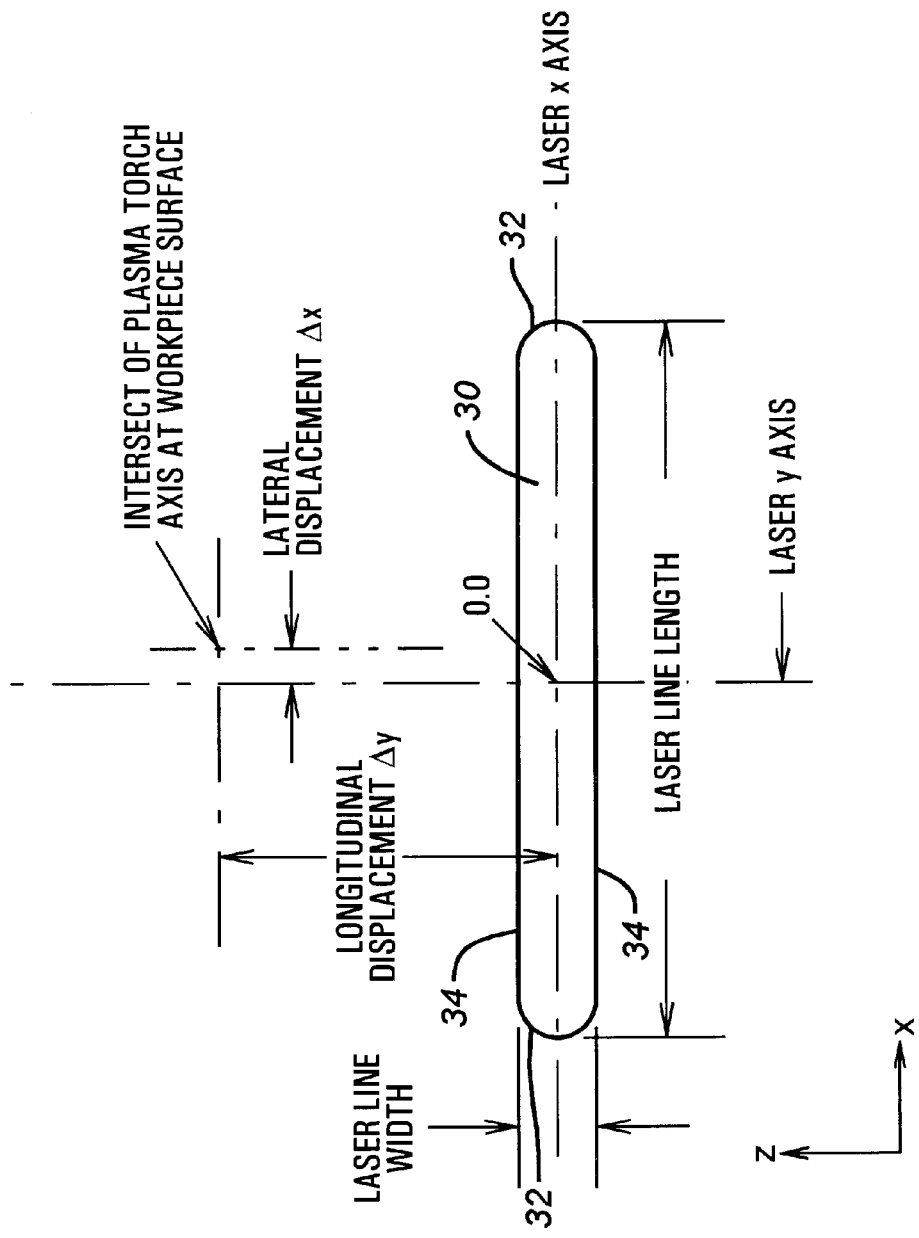
FIG. 4 is an enlarged top view of a laser beam cross sectional area for use in practicing the present invention.

The invention further comprises irradiating the surface of the substrate with a laser beam 30 having an oval/rectangular cross sectional area as shown in FIGS. 3–4. The term "oval/rectangular", as used herein, refers to a cross sectional area comprising two straight parallel sides and two opposing curved edges connecting the parallel sides, such that if the curved edges were replaced with straight edges, the cross sectional area would be rectangular. The irradiating takes place at a sufficient energy and for a sufficient time to melt a portion of the substrate, such that it forms an alloy with the precursor, as shown in Block 12 of FIG. 1.

In one preferred embodiment, the laser beam is generated by a carbon dioxide laser having a power level of at least 400 watts. In another preferred embodiment, the laser beam is generated by a Nd:YAG laser as shown in FIG. 3.

A preferred embodiment of the laser beam cross sectional area is shown in FIG. 4. The laser beam 30 has a cross sectional area comprising two curved edges 32 and two straight sides 34. The distance between the straight sides is referred to as the "beam width". The distance between opposing curved edges along the axis which bisects the beam width is referred to as "beam length". In one preferred embodiment, the length of each parallel side is at least four times the beam width. In another preferred embodiment, the length of each parallel side is less than or equal to 10 times the beam width.

Figure 1:
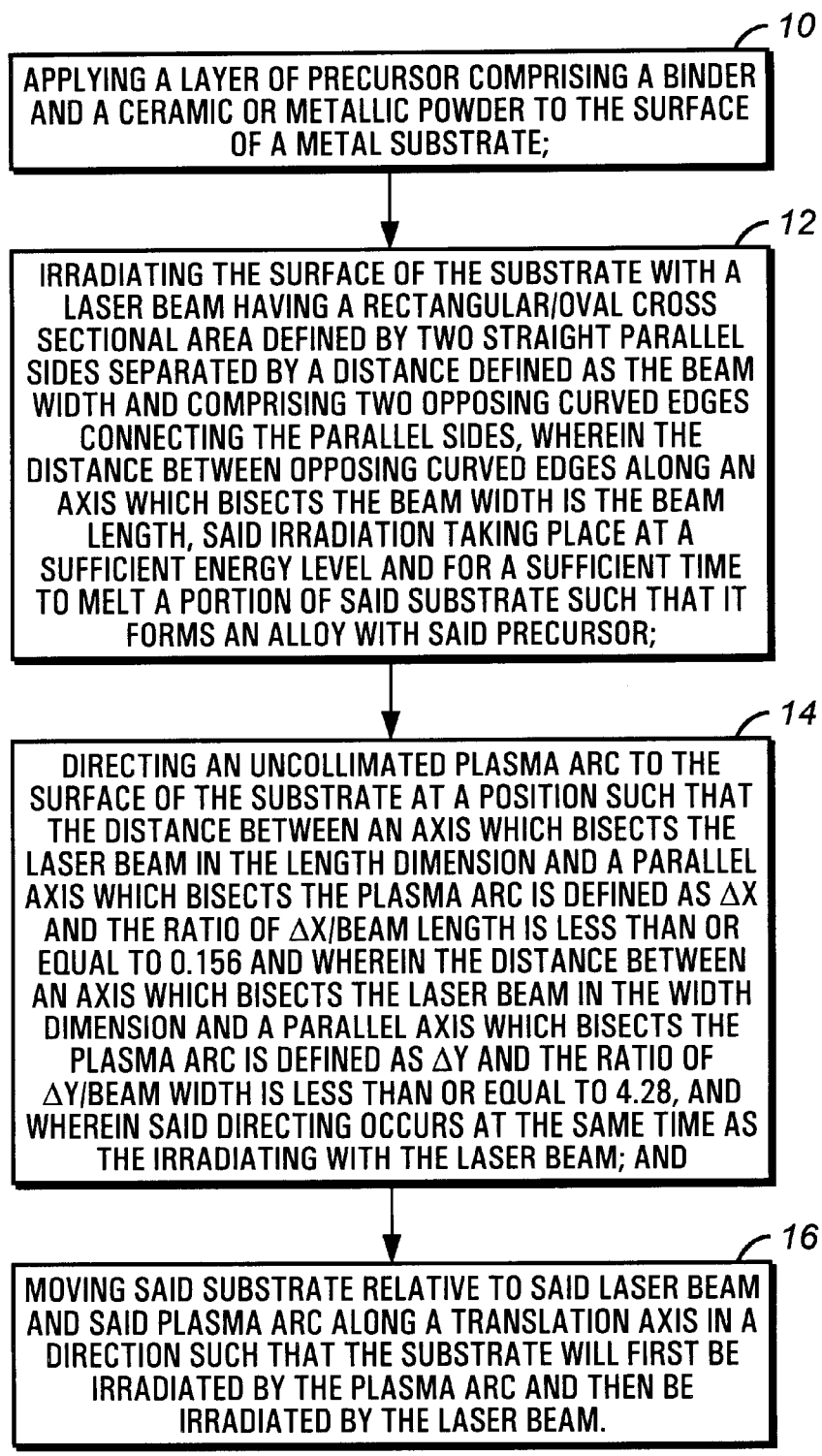
FIG. 1 are block diagrams of the first embodiment of the present invention.

The invention further comprises directing an uncollimated plasma arc 42 to the surface of the substrate at the same time and location as the irradiating with the laser beam, as shown in Block 14 of FIG. 1. In a preferred embodiment, a plasma torch 40 is used to generate the plasma arc 42. In another preferred embodiment, the plasma arc has a current level of at least 25 amperes.

The invention further comprises moving the substrate relative to the laser beam and plasma arc, as shown in Block 16 of FIG. 1. In a preferred embodiment, the substrate is moved relative to the laser beam and plasma arc at a translation rate of at least 100 millimeters per minute, as shown in FIG. 3. The translation axis along which the laser beam and plasma arc are moved relative to the substrate is labeled 36 in FIG. 3.

The axis 36 on FIG. 3 is labeled with a "+" and a "−" sign to denote movement in either direction along the axis. When the substrate is moved in the − direction, it will be irradiated first by the plasma arc and then be irradiated by the laser. This embodiment of the invention is referred to as "plasma leading". When the substrate is moved in the + direction, along the translation axis, it will be irradiated first by the laser and then be irradiated by the plasma arc. This embodiment of the invention is referred to as "laser leading".

The translation axis direction depicted in FIG. 3 is referred to herein as the "y axis". The axis perpendicular to the y axis is referred to as the "x axis". The distance in the y axis directions between an axis which bisects the laser beam in the width dimension and a parallel axis which bisects the plasma arc is referred to as "$\Delta y$". In the plasma leading environment, the ratio of $\Delta y$ to laser beam width should be less than or equal to 4.28. In the laser leading embodiment, the ratio of $\Delta y$ to laser beam width should be less than or equal to 0.89.

In FIG. 3, dotted line 50 represents an axis in the y dimension which bisects the laser beam in its length dimension. In FIG. 3, dotted line 52 represents an axis in the y dimension which bisects the plasma arc. As shown in FIG. 3, axis 52 is parallel to axis 50. The displacement in the x dimension between axis 50 and axis 52 is referred to as "$\Delta x$". The ratio of $\Delta x$ to laser beam length should be less than or equal to 0.156.

Figure 2:
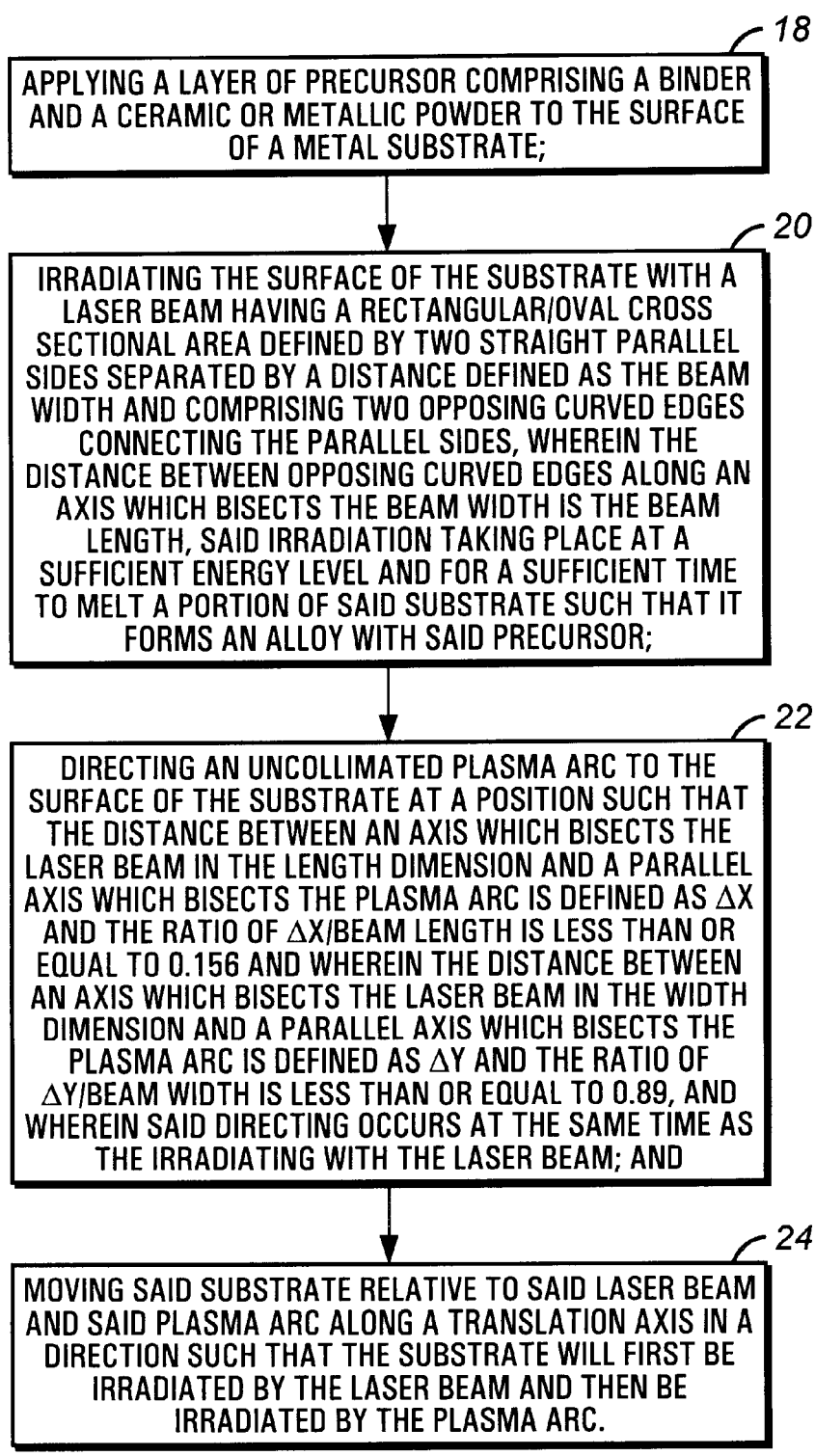
FIG. 2 are block diagrams of the second embodiment of the present invention.

Another embodiment of the present invention is depicted in FIG. 2. As shown in Blocks 18, 20, 22 and 24 of FIG. 2, this embodiment of the invention is directed toward the use of a laser beam having a rectangular cross sectional area in which the longer sides of the rectangular cross sectional area are at least four times as long as the shorter sides of the rectangular cross sectional area and in which the substrate is moved at a translation rate of at least 100 millimeters per minute relative to the plasma arc and the laser beam.

Figure 5A:
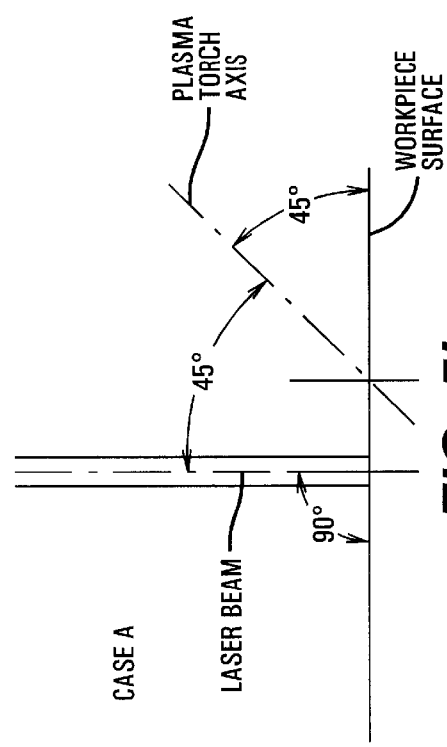
FIGS. 5a–5d are side views of four embodiments of the laser beams and plasma arc of the present invention at various angular orientations.
Figure 5B:
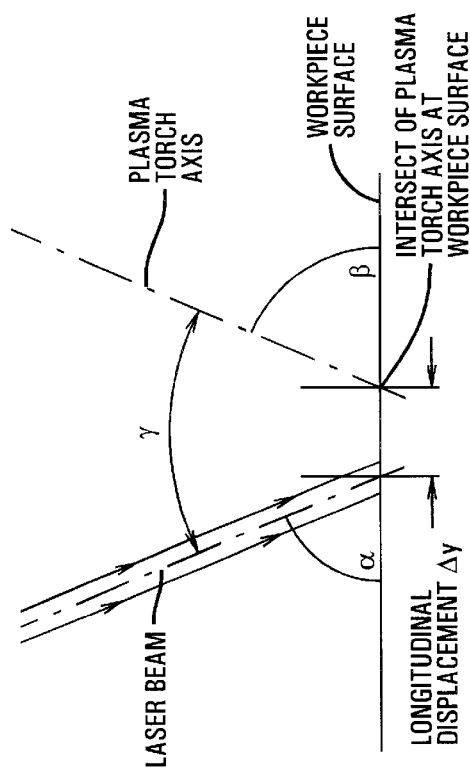
Figure 5C:
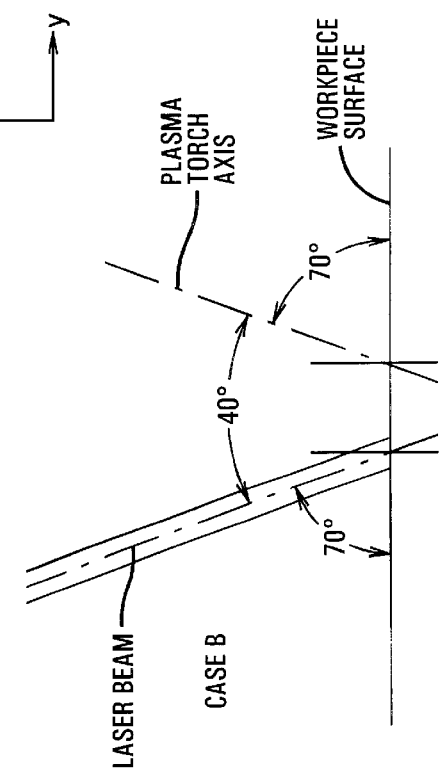
Figure 5D:
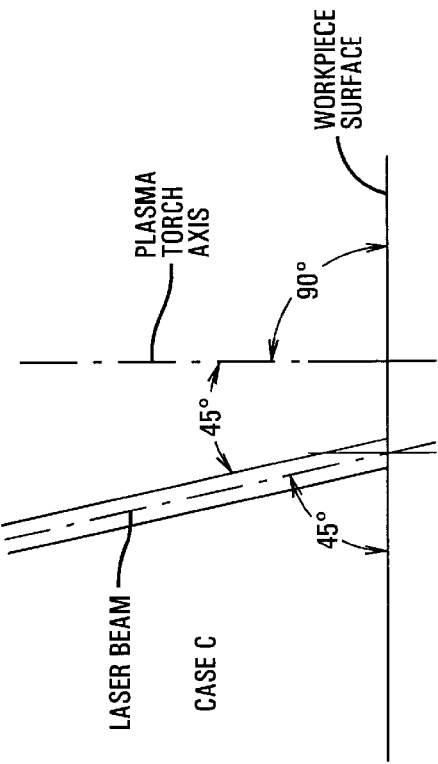

The angular orientations of the laser beam and the plasma arc with respect to the substrate alpha ($\alpha$) and beta ($\beta$), respectively, can be varied, as shown in FIGS. 5a–5d. In one preferred embodiment, $\alpha$ and $\beta$ are 90° and 45°, respectively, as shown in FIG. 5b. In another preferred embodiment, $\alpha$ and $\beta$ are 70° and 70°, respectively, as shown in FIG. 5c. In a third embodiment, $\alpha$ and $\beta$ are 45° and 90° respectively.

The foregoing disclosure and description of the invention are illustrative and explanatory. Various changes in the size, shape, and materials, as well as in the details of the illustrative construction may be made without departing from the spirit of the invention.

What is claimed is:

1. A method for laser/plasma surface modification comprising:
   a. applying a precursor layer comprising a binder and a ceramic or metallic powder to the surface of a metal substrate;
   b. irradiating the surface of the substrate with a laser beam having a rectangular/oval cross sectional area defined by two straight parallel sides separated by a distance defined as the beam width and comprising two opposing curved edges connecting the parallel sides, wherein the distance between opposing curved edges along an axis which bisects the beam width is the beam length, said irradiation taking place at a sufficient energy level and for a sufficient time to melt a portion of said substrate such that it forms an alloy with said precursor;
   c. directing an uncollimated plasma arc to the surface of the substrate at a position such that the distance between an axis which bisects the laser beam in the length dimension and a parallel axis which bisects the plasma arc is defined as $\Delta x$ and the ratio of $\Delta x$/beam length is less than or equal to 0.156 and wherein the distance between an axis which bisects the laser beam in the width dimension and a parallel axis which bisects the plasma arc is defined as $\Delta y$ and the ratio of $\Delta y$/beam width is less than or equal to 4.28, and wherein said directing occurs at the same time as the irradiating with the laser beam; and
   d. moving said substrate relative to said laser beam and said plasma arc along a translation axis in a direction such that the substrate will be irradiated first by the plasma arc and then be irradiated by the laser beam.

2. The method of claim 1, wherein a plasma torch is used to generate the plasma arc.

3. The method of claim 1, wherein said laser beam is generated by a carbon dioxide laser having a power level of at least 400 watts.

4. The method of claim 3, wherein said plasma arc has a current level of at least 25 amperes.

5. The method of claim 1, wherein said substrate is moved relative to said laser and said plasma at a speed of at least 100 millimeters per minute.

6. The method of claim 1, wherein the length of each of said parallel sides, is at least 4 times the beam width.

7. The method of claim 6, wherein the length of each of said parallel sides is less than or equal to ten times the beam width.

8. The method of claim 1 wherein said powder comprises chromium or silicon carbide.

9. A method for laser/plasma surface modification comprising:
   a. applying a precursor layer comprising a binder and a ceramic or metallic powder to the surface of a metal substrate;
   b. irradiating the surface of the substrate with a laser beam having a rectangular/oval cross sectional area defined by two straight parallel sides separated by a distance defined as the beam width and comprising two opposing curved edges connecting the parallel sides, wherein the distance between opposing curved edges along an axis which bisects the beam width is the beam length, said irradiation taking place at a sufficient energy level and for a sufficient time to melt a portion of said substrate such that it forms an alloy with said precursor;
   c. directing an uncollimated plasma arc to the surface of the substrate at a position such that the distance between an axis which bisects the laser beam in the length dimension and a parallel axis which bisects the plasma arc is defined as $\Delta x$ and the ratio of $\Delta x$/beam length is less than or equal to 0.156 and wherein the distance between an axis which bisects the laser beam in the width dimension and a parallel axis which bisects the plasma arc is defined as $\Delta y$ and the ratio of $\Delta y$/beam width is less than or equal to 0.89, and wherein said directing occurs at the same time as the irradiating with the laser beam; and
   d. moving said substrate relative to said laser beam and said plasma arc along a translation axis in a direction such that the substrate will be irradiated first by the laser beam and then be irradiated by the plasma arc.

10. The method of claim 9, wherein a plasma torch is used to generate the plasma arc.

11. The method of claim 9, wherein said laser beam is generated by a carbon dioxide laser having a power level of at least 400 watts.

12. The method of claim 11, wherein said plasma arc has a current level of at least 25 amperes.

13. The method of claim 9, wherein said substrate is moved relative to said laser and said plasma at a speed of at least 100 millimeters per minute.

14. The method of claim 9, wherein the length of each of said parallel sides, is at least 4 times the beam width.

15. The method of claim 14, wherein the length of each of said parallel sides is less than or equal to ten times the beam width.

16. The method of claim 9 wherein said powder comprises chromium or silicon carbide.

17. A method for plasma assisted laser surface alloying comprising:
   a. applying a precursor layer comprising a binder and a ceramic or metallic powder to the surface of a metal substrate;
   b. irradiating the surface of the substrate with a laser beam having a rectangular/oval cross sectional area defined by two straight parallel sides separated by a distance defined as the beam width and comprising two opposing curved edges connecting the parallel sides, wherein the distance between opposing curved edges along an axis which bisects the beam width is the beam length, said irradiation taking place at a sufficient energy level and for a sufficient time to melt a portion of said substrate such that it forms an alloy with said precursor;
   c. directing an uncollimated plasma arc to the surface of the substrate at a position such that the distance between an axis which bisects the laser beam in the length dimension and a parallel axis which bisects the plasma arc is defined as $\Delta x$ and the ratio of $\Delta x$/beam length is less than or equal to 0.156 and wherein the distance between an axis which bisects the laser beam in the width dimension and a parallel axis which bisects the plasma arc is defined as $\Delta y$ and the ratio of $\Delta y$/beam width is less than or equal to 0.89, and wherein said directing occurs at the same time as the irradiating with the laser beam; and
   d. moving said substrate relative to said laser beam and said plasma arc at a speed of at least 100 millimeters per minute.

18. The method of claim 17, wherein said laser beam is generated by a carbon dioxide laser having a power level of at least 400 watts.

19. The method of claim 17 wherein said laser beam is generated by an Nd:YAG laser.

20. The method of claim 17 wherein said powder comprises chromium or silicon carbide.

* * * * *